United States Patent [19]

Maxwell

[11] Patent Number: 4,838,379
[45] Date of Patent: Jun. 13, 1989

[54] GEOPHONE IMPLANTING AND POSITIONING APPARATUS

[75] Inventor: Peter W. Maxwell, Voorschoten, Netherlands

[73] Assignee: Geosource, Inc., Ft. Worth, Tex.

[21] Appl. No.: 113,138

[22] Filed: Oct. 23, 1987

[51] Int. Cl.$^4$ .............................................. G01V 1/16
[52] U.S. Cl. ................................... 181/122; 367/178; 367/188; 33/351; 33/354; 33/73
[58] Field of Search ................ 181/0.5, 101, 122, 400, 181/401; 367/2, 13, 14, 76, 106, 116, 129, 130, 134, 140, 153, 177, 178, 188, 191; 33/351, 352, 353, 354, 379, 1 HM; 73/649, 654

[56] References Cited

U.S. PATENT DOCUMENTS 2,857,679 10/1958 Bleu ................................. 33/354 X
4,300,220 11/1981 Goff et al. .......................... 367/188

FOREIGN PATENT DOCUMENTS 11499 of 1886 United Kingdom ................ 181/122

OTHER PUBLICATIONS

Litton Resources Systems Brochure, Geophone Cases, Litton Resources Systems, Tex., U.S.A., 1984, pp. 1–4.
Mark Products Brochure, TDC-II, Land Case, Mark Products U.S., Inc., Ltd., Houston, Tex., U.S.A., 10/85, pp. 1–2.
Coffeen, J. A., Seismic Exploration Fundamentals, The Use of Seismic Techniques in Finding Oil, Petroleum Publishing Co., Tulsa, Okla., 5/80, pp. 54–56.
OYO Brochure, "Case Planting Tool", 10/87.

Primary Examiner—Brian S. Steinberger
Attorney, Agent, or Firm—Andrew J. Dillon

[57] ABSTRACT

An apparatus for implanting and positioning a geophone assembly into the earth is disclosed. The geophone implanting apparatus includes a receptacle for receiving and retaining a geophone assembly. A magnetic compass and a cylindrical bubble level are mounted concentrically approximately one meter from the receptacle so that the ferromagnetic properties of the geophone do not induce errors in the azimuth measurement. A pair of radially disposed handles are utilized to rotationally manipulate the geophone into a proper orientation during implantation. After the geophone assembly has been implanted and leveled a release mechanism is utilized to release the geophone from the receptacle by deforming a spring grip mechanism which is utilized to retain the geophone. In the depicted embodiment, a geophone assembly having a radially non-symmetric case is utilized in conjunction with a matching receptacle so that a unique orientation of the geophone may be accomplished.

13 Claims, 2 Drawing Sheets

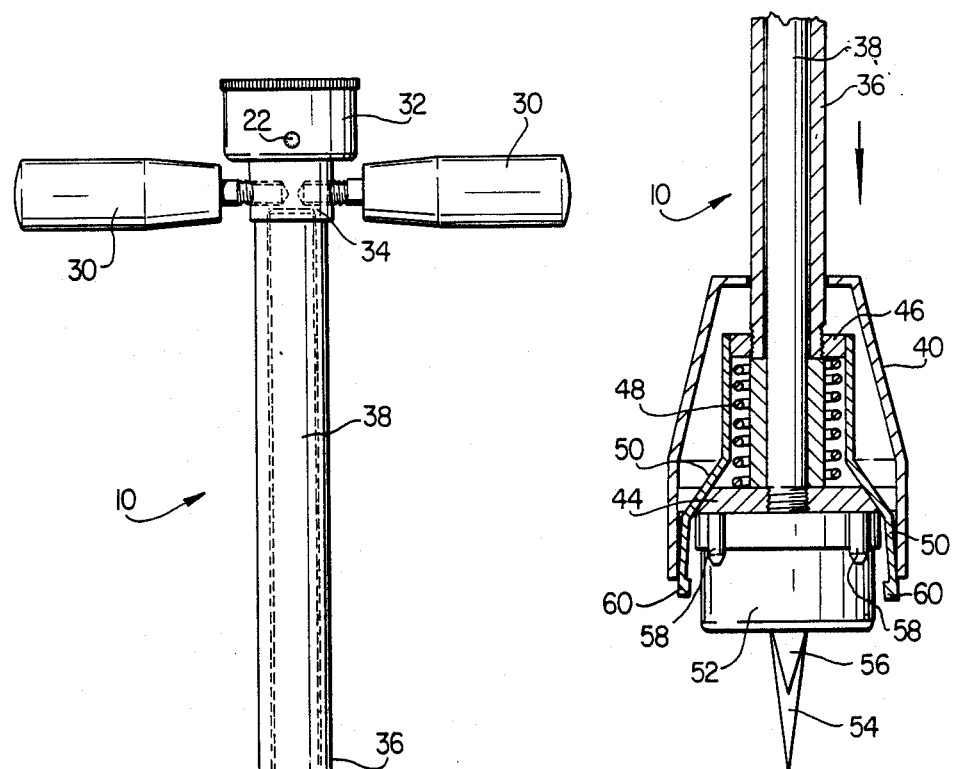
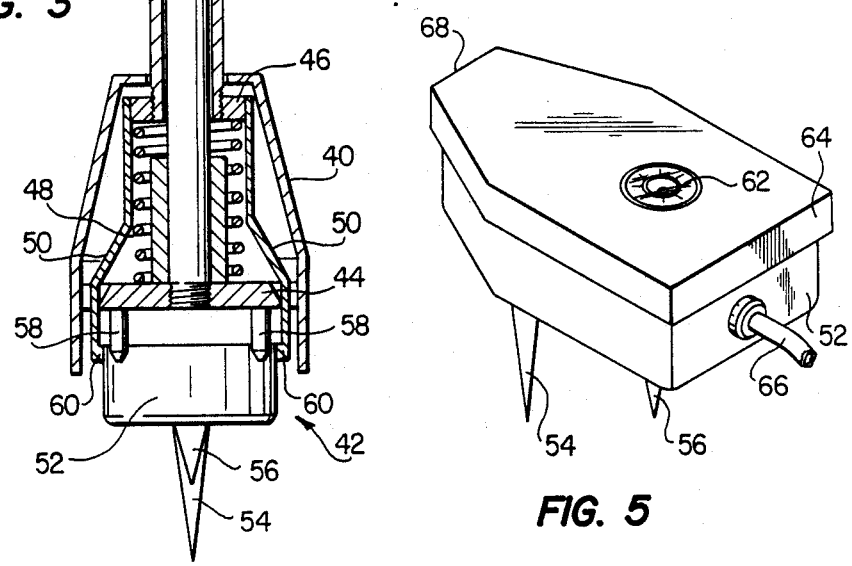
FIG. 3
FIG. 4
FIG. 5

GEOPHONE IMPLANTING AND POSITIONING APPARATUS

BACKGROUND OF THE INVENTION

1. Field of the Invention:

This invention relates in general to the field of seismic prospecting and in particular to an apparatus for implanting and positioning a geophone assembly into the earth in a desired orientation and in a level condition.

2. Description of the Prior Art

In seismic exploration, sound waves are commonly used to probe the earth's crust as a means of determining the types and location of subsurface formations The earth's crust can be considered a transmission medium or filter whose characteristics are to be determined by passing sound waves through that medium In the reflection seismic method, sound disturbances are made at a transmission point at or near the earth's surface, and sound waves which are reflected from subsurface reflecting boundaries are detected by seismic detectors, e.g. geophones, which generate electrical signals at their outputs. Information relating to subsurface formations is contained in these electrical signals, and the signals are recorded in a form which permits analysis. Skilled interpreters can discern from the analysis the shape and depth of subsurface reflection boundaries and the likelihood of finding an accumulation of minerals, such as oil or gas.

In a typical seismic field recording system, the arrays of seismic detectors are located at regularly spaced intervals along that portion of the earth's surface under consideration. A typical seismic exploration system also includes a recording truck and a multi-pair of cable, which is used to connect the outputs of the detector rays to the recording truck. Typically, a pair of wires is "taken out" of the recording cable for appropriate connection to the output of each array. The location at which a given pair is taken out of the cable has been referred to by such designations as "receiver point", "receiver station", or "station". The data obtained at each receiver point from the output of an array of detectors forms a "channel" of information, which is provided to the recording apparatus for analysis and interpretation.

It is important in such exploration that each geophone in an array be placed in proper orientation with respect to the other geophones in the array and level with respect to the earth's surface. This is particularly important in view of the fact that recently detector arrays have been developed which utilize geophone assemblies which have focused directional characteristics, either in a single dimension or in multiple dimensions. These characteristics and a desire in the industry for increased accuracy in the precise determination of the location of subsurface formations have made accurate geophone positioning and placement a key requirement in the industry.

SUMMARY OF THE INVENTION

It is therefore one object to the present invention to provide an improved seismic exploration system.

It is another object of the present invention to provide an improved seismic exploration system which includes means for positioning a plurality of geophone assemblies.

It is yet another object of the present invention to provide an improved seismic exploration system which includes means for accurately positioning a plurality of geophone assemblies along a predetermined azimuth.

The foregoing objects are achieved as is now described. The geophone implanting and positioning apparatus of the present invention includes a receptacle for receiving and retaining a geophone assembly. In a preferred embodiment of the present invention a magnetic compass is mounted on nonmagnetic material approximately one meter from the receptacle so that the ferromagnetic properties of the geophone assembly will not adversely effect the accuracy of the azimuth reading. Thus, a geophone assembly may be accurately positioned along a desired azimuth by utilizing the geophone implanting and positioning apparatus of the present invention.

In accordance with a second aspect of the present invention a cylindrical bubble level is also provided and preferably mounted concentrically within the magnetic compass. In this manner, the levelness and azimuth of a geophone assembly may be simultaneously corrected. Preferably the geophone implanting and positioning apparatus of the present invention includes a pair of radially disposed handles which are utilized to rotatably manipulated the apparatus to achieve the desired azimuth prior to geophone implementation. Once the desired position has been obtained a release mechanism is utilized to release the geophone assembly.

In one embodiment of the present invention a geophone assembly is utilized which incorporates a radially nonsymmetrical case. The receptacle within the geophone implanting and positioning apparatus is then especially designed to accommodate the geophone in a unique spatial relationship in order to assure that directional integrity is retained.

BRIEF DESCRIPTION OF THE DRAWING

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 3 is a partially cut away view of a geophone implanting and positioning apparatus of the present invention;

FIG. 4 is cut away view of a portion of the geophone implanting and positioning apparatus of the present invention which discloses the geophone release mechanism; and FIG. 5 is a perspective view of a novel geophone case which may be utilized with the geophone implanting and positioning apparatus of the present invention.

DETAILED DESCRIPTION OF THE INVENTION

Figure 1:
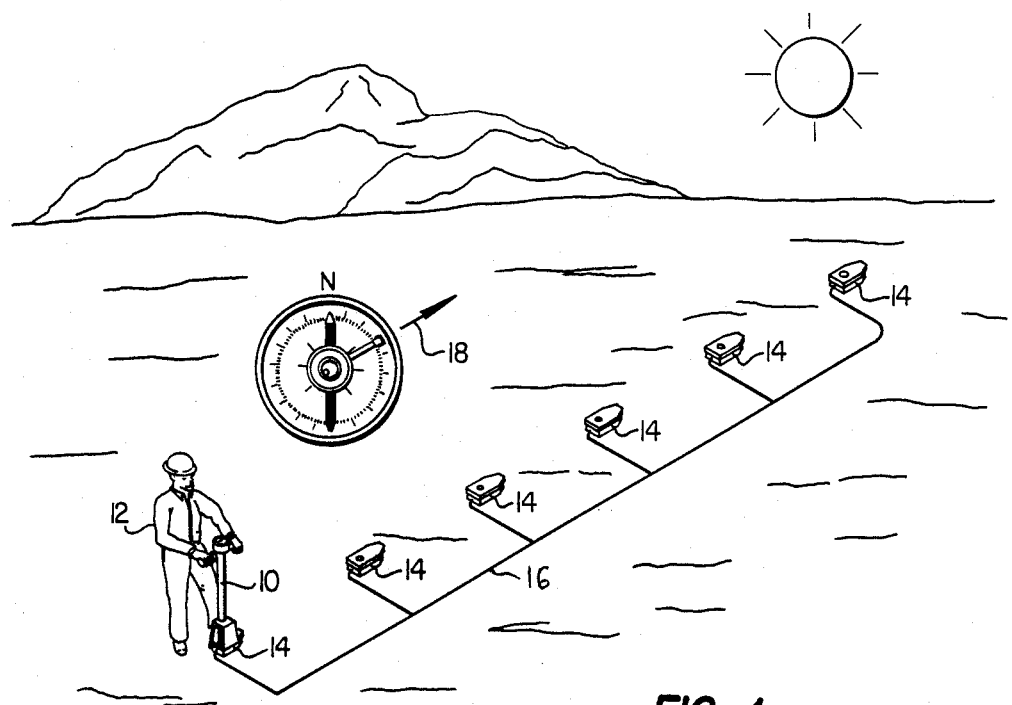
FIG. 1 is a perspective view of a plurality of geophones implanted in the earth and disposed along a desired azimuth by utilization of the geophone implanting and positioning apparatus of the present invention.

With reference now to the figures and in particular with reference to FIG. 1, there is depicted a perspective view of a plurality of geophones disposed along a desired azimuth by utilization of the geophone implanting and positioning apparatus of the present invention. As can be seen in FIG. 1, an operator 12 has utilized the geophone implanting and positioning apparatus 10 of the present invention to implant and position a plurality of geophones 14 along a desired azimuth 18. Those skilled in the art will appreciate that geophones 14 are preferably electrically coupled to a recording truck by means of multi-pair cable 16. It should also be apparent that in actual geophysical prospecting operations the number of geophones and geophone assemblies utilized will greatly exceed the amount depicted in FIG. 1.

Figure 2:
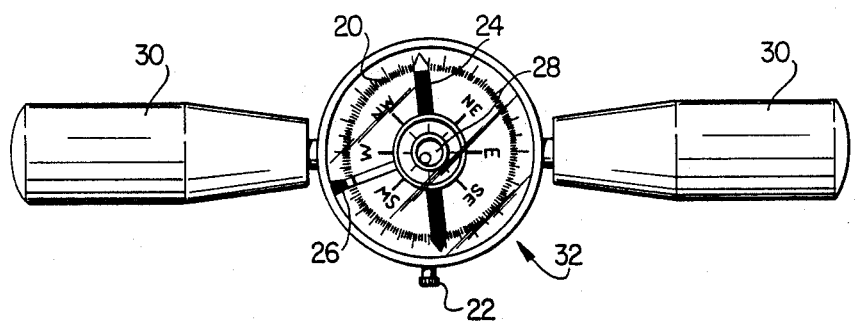
FIG. 2 is a top view of the geophone implanting and positioning apparatus of the present invention.

Referring now to FIG. 2, there is depicted a top view of geophone implanting and positioning apparatus 10 of the present invention. As can be seen, geophone implanting and positioning apparatus 10 includes a compass 32 which utilizes a rotatable compass card 20. Rotatable compass card 20 preferably includes annotations and markings showing the relative magnetic directions which are typically illustrated on a compass card. Set screw 22 may be utilized in a manner well known in the art to lock the position of rotatable compass card 20 into a desired position with respect to compass 32. Of course, those skilled in the art will appreciate that compass 32 will also include a compass needle 24 which will freely pivot to indicate the direction of magnetic north. Additionally, azimuth indicator 26 may be provided and may be freely manually rotated to serve to indicate a particular desired azimuth. Finally, handles 30 are also depicted in FIG. 2 and are provided to enhance the rotationally manipulation of geophone implanting and positioning apparatus 10 during implantation in order to achieve a desired azimuth.

With reference now to FIG. 3, there is depicted a partially cut away view of geophone implanting and positioning apparatus 10 of the present invention. As can be seen, compass 32 is fixedly mounted to upper assembly 34 which also serves to mount handles 30 via threaded screws or other suitable mounting methods. Extending downward from upper assembly 34 is inner shaft 38 which serves to rigidly mount plate 44 at a distance of approximately one meter from upper assembly 34. This particular dimension is important in that those skilled in the art will appreciate that geophone assemblies typically include magnets and other ferromagnetic materials which are likely to induce errors in the azimuth readings taken utilizing compass 32. Thus, by constructing the majority of geophone implanting and positioning apparatus 10 from nonferromagnetic materials such as aluminum it is possible to isolate compass 32 from the ferromagnetic materials contained within geophone assembly 52.

Outer sleeve 36 is preferably slidably mounted exterior to inner shaft 38 and abuts upper assembly 34 at its upper end. The lower end of outer sleeve 36 is slidably received in an appature (not shown) of housing 40 and is fixedly mounted to spring compression plate 46 at its lower most end.

Also mounted to spring compression plate 46 are leaf springs 50 which, in conjunction with leaf spring lips 60 serve to engage and retain geophone assembly 52 within receptacle 42 of housing 40. Coil spring 48 is utilized to provide mechanical bias against spring compression plate 46 in an upward direction, ensuring that leaf springs 50 will retain geophone assembly 52 in the position depicted. Mounting pegs 58 are utilized to provide a unique orientation of geophone assembly 52 within receptacle 42 in a manner which will be explained in greater detail below. Additionally, geophone assembly 52 includes rotational spike 54 and implanting spike 56 which are utilized to retain geophone assembly 52 in an implanted condition in the earth. Those skilled in the art will appreciate that rotational spike 54 may be brought into contact with the earth and geophone assembly 52 may then be pivotally rotated until a desired azimuth is achieved. At that point, implanting spike 56 is also driven into the earth preventing further rotation of geophone assembly 52.

Referring now to FIG. 4, there is depicted a partial cut away view of geophone implanting and positioning apparatus 10 of the present invention which describes the geophone release mechanism. As can be seen in FIG. 4, outer sleeve 36 has been manually urged downward from its abutting relationship with upper assembly 34. Thus, spring compression plate 46 has been urged downward causing leaf springs 50 to widen in response to contact with plate 44. In this manner, leaf spring lips 60 are urged out of contact with geophone assembly 52 and geophone implanting and positioning apparatus 10 may be lifted, releasing geophone assembly 52 and allowing it to remain implanted in the earth in a desired orientation. Once geophone implanting and positioning apparatus 10 has been lifted, coil spring 48 may be allowed to urge outer sleeve 36 back to its upward position releasing leaf springs 50 back to the position in FIG. 3. In this manner, those skilled in the art will appreciate that geophone assembly 52 may be selectively engaged and retained within receptacle 42 until such time as operator 12 (see FIG. 1) desires to release geophone assembly 52 by manually urging outer sleeve 36 into the downward position, spreading leaf spring lips 60.

With reference now to FIG. 5, there is depicted a perspective view of a novel geophone case which may be utilized with geophone implanting and positioning apparatus 10 of the present invention. As can be seen, geophone assembly 52 includes rotational spike 54 and implanting spike 56 which may be utilized to permit rotation and implantation of geophone assembly 52 in a manner described above. Geophone assembly 52 also includes, cable 66 which may be utilized to couple the output of geophone elements within geophone assembly 52 to the recording truck for analysis and interpretation. Additionally, a second cylindrical bubble level 62 may be provided on the case of geophone assembly 52 to permit the operator to ascertain that geophone assembly 52 is truly level after implantation utilizing geophone implantation and positioning apparatus 10.

Those skilled in the art will also appreciate upon reference to FIG. 5, that the case of geophone assembly 52 is radially nonsymmetrical. This is due to trapezoidal case end 68 which gives geophone assembly 52 a unique directional orientation. The shape of the case of geophone assembly 52 may then be utilized in conjunction with mounting pegs 58 within receptacle 42 (see FIGS. 3 and 4) to ensure that geophone assembly 52 is properly oriented within receptacle 42 during implantation of geophone assembly 52 into the earth. In this manner, those skilled in the art will appreciate that it will be possible utilizing geophone implanting and positioning apparatus 10 of the present invention to position a large number of geophone assemblies over a substantial geographic distance along a relatively accurate line of bearing or azimuth and ensure that each geophone assembly has been placed in a properly oriented and level position.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An implement for use by an operator in the implanting and positioning of an encased geophone assembly, said encased geophone assembly having at least one geophone mounted therein, said implement comprising:
   a receptacle for receiving and retaining said encased geophone assembly;
   a magnetic compass fixedly mounted to said receptacle for providing an indication of azimuth relative to the position of said encased geophone assembly, said magnetic compass mounted a substantial distance from said receptacle wherein errors induced in said magnetic compass due to any ferromagnetic properties of said encased geophone assembly are minimized; and
   means for releasing said encased geophone assembly from said receptacle.

2. An implement for use by an operator in implanting and positioning an encased geophone assembly according to claim 1 further including at least two radially mounted members fixedly mounted to said receptacle wherein rotational manipulation of said receptacle may be induced by rotation of said at least two radially mounted members.

3. An implement for use by an operator in implanting and positioning an encased geophone assembly according to claim 1 further including a flexible member disposed within said receptacle for gripping said encased geophone assembly.

4. An implement for use by an operator in implanting and positioning an encased geophone assembly according to claim 3 wherein said means for releasing said encased geophone assembly from said receptacle comprises means for deforming said flexible member wherein said encased geophone assembly is released.

5. An implement for use by an operator in implanting and positioning an encased geophone assembly according to claim 1 wherein said implement is constructed of non-ferromagnetic material.

6. An implement for use by an operator in implanting and positioning an encased geophone assembly according to claim 5 wherein said non-ferromagnetic material comprises aluminum.

7. An implement for use by an operator in the implanting and positioning of an encased geophone assembly, said encased geophone assembly having at least one geophone mounted therein, said implement comprising:
   a receptacle for receiving and retaining said encased geophone assembly;
   a magnetic compass fixedly mounted to said receptacle for providing an indication of azimuth relative to the position of said encased geophone assembly, said magnetic compass mounted a substantial distance from said receptacle wherein errors induced in said magnetic compass due to any ferromagnetic properties of said encased geophone assembly are minimized;
   a level indicating means fixedly mounted to said receptacle for providing an indication of the levelness of said encased geophone assembly; and
   means for releasing said encased geophone assembly from said receptacle.

8. An implement for use by an operator in implanting and positioning an encased geophone assembly according to claim 7 wherein said level indication means comprises a cylindrical bubble level.

9. The implement for use by an operator in implanting and positioning an encased geophone assembly according to claim 7 wherein said magnetic compass and said level indication means are disposed proximate to each other wherein both azimuth and levelness may be visually ascertained simultaneously.

10. The implement for use by an operator in implanting and positioning an encased geophone assembly according to claim 9 wherein said magnetic compass and said level indication means are disposed concentrically.

11. An implement for use by an operator in the implanting and positioning of a geophone assembly, said geophone assembly having at least one geophone encased within a radially non-symmetrical case, said implement comprising:
   a receptacle for receiving and retaining said radially non-symmetrical case in a predetermined orientation with respect to said receptacle;
   a magnetic compass fixedly mounted to said receptacle for providing an indication of azimuth relative to the position of said radially non-symmetrical case, said magnetic compass mounted a substantial distance from said receptacle wherein errors induced in said magnetic compass due to any ferromagnetic properties of said geophone assembly are minimized; and
   means for releasing said radially non-symmetrical case from said receptacle.

12. An implement for use by an operator in the implanting and positioning of a geophone assembly according to claim 11 further including a flexible member disposed within said receptacle for gripping said radially non-symmetrical case.

13. An implement for use by an operator in the implanting and positioning of a geophone assembly according to claim 11, wherein said means for releasing said radially non-symmetrical case from said receptacle comprises means for deforming said flexible member wherein said radially non-symmetrical case is released.

* * * * *